United States Patent
Haraguchi et al.

(10) Patent No.: US 8,884,979 B2
(45) Date of Patent: Nov. 11, 2014

(54) PROJECTION DISPLAY APPARATUS

(75) Inventors: Masahiro Haraguchi, Daito (JP);
Masutaka Inoue, Hirakata (JP);
Yoshinao Hiranuma, Hirakata (JP);
Tomoya Terauchi, Daito (JP); Susumu Tanase, Kadome (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 412 days.

(21) Appl. No.: 13/183,926

(22) Filed: Jul. 15, 2011

(65) Prior Publication Data
US 2012/0013634 A1 Jan. 19, 2012

(30) Foreign Application Priority Data
Jul. 16, 2010 (JP) ................... 2010-161744

(51) Int. Cl.
*G09G 5/02* (2006.01)
*G03B 43/00* (2006.01)
*H04N 9/31* (2006.01)
*G03B 17/54* (2006.01)

(52) U.S. Cl.
CPC .............. *H04N 9/3194* (2013.01); *G03B 43/00* (2013.01); *H04N 9/3185* (2013.01); *G03B 17/54* (2013.01); *G09G 2320/0693* (2013.01)
USPC .......................................... 345/589; 345/585

(58) Field of Classification Search
CPC combination set(s) only.
See application file for complete search history.

(56) References Cited

U.S. PATENT DOCUMENTS 8,272,746 B2    9/2012  Furui
2007/0065004 A1  3/2007  Kochi et al.
2008/0136976 A1  6/2008  Ajito et al.
2009/0091582 A1* 4/2009  Ajito et al. ................. 345/589
2010/0201702 A1* 8/2010  Franik et al. ............... 345/589
2010/0225887 A1* 9/2010  Sato et al. .................. 353/31
2010/0322482 A1 12/2010  Kochi et al.

FOREIGN PATENT DOCUMENTS

JP          2001-83949 A      3/2001
(Continued)

OTHER PUBLICATIONS

English Abstract and Translation for JP 2005-234698 A, published Sep. 2, 2005.
Office Action mailed Jun. 11, 2013 in a counterpart Japanese application 2010-161744.
(Continued)

*Primary Examiner* — Kee M Tung
*Assistant Examiner* — Leon T Cain, II
(74) *Attorney, Agent, or Firm* — NDQ&M Watchstone LLP

(57) ABSTRACT

A projection display apparatus includes an imager that modulates light emitted from a light source and a projection unit that projects light emitted from the imager on a projection surface. The projection display apparatus includes: an imager controller that controls the imager to display a test pattern image in which a characteristic point is defined by at least three adjacent regions; an acquisition unit that acquires a captured image of the test pattern image from an imaging element configured to capture the test pattern image projected on the projection surface; and an adjustment unit that identifies the characteristic point included in the captured image on the basis of the captured image acquired by the acquisition unit and adjusts an image to be projected on the projection surface on the basis of the identified characteristic point. The at least three adjacent regions surround the characteristic point and are adjacent to the characteristic point.

11 Claims, 14 Drawing Sheets

(56) References Cited

FOREIGN PATENT DOCUMENTS

| | | |
|---|---|---|
| JP | 2003-018503 A | 1/2003 |
| JP | 2005-234698 A | 9/2005 |
| JP | 2007-064627 A | 3/2007 |
| JP | 2008-242342 A | 10/2008 |
| JP | 2010-050540 | 3/2010 |
| WO | 2006/025191 A | 3/2006 |

OTHER PUBLICATIONS

Office Action mailed May 20, 2014 in a counterpart Japanese application JP 2013-157368.
English Abstract and Translation for JP 2003-018503 A, published Jan. 17, 2003.
English Abstract and Translation for JP 2008-242342 A, published Oct. 9, 2008.

* cited by examiner

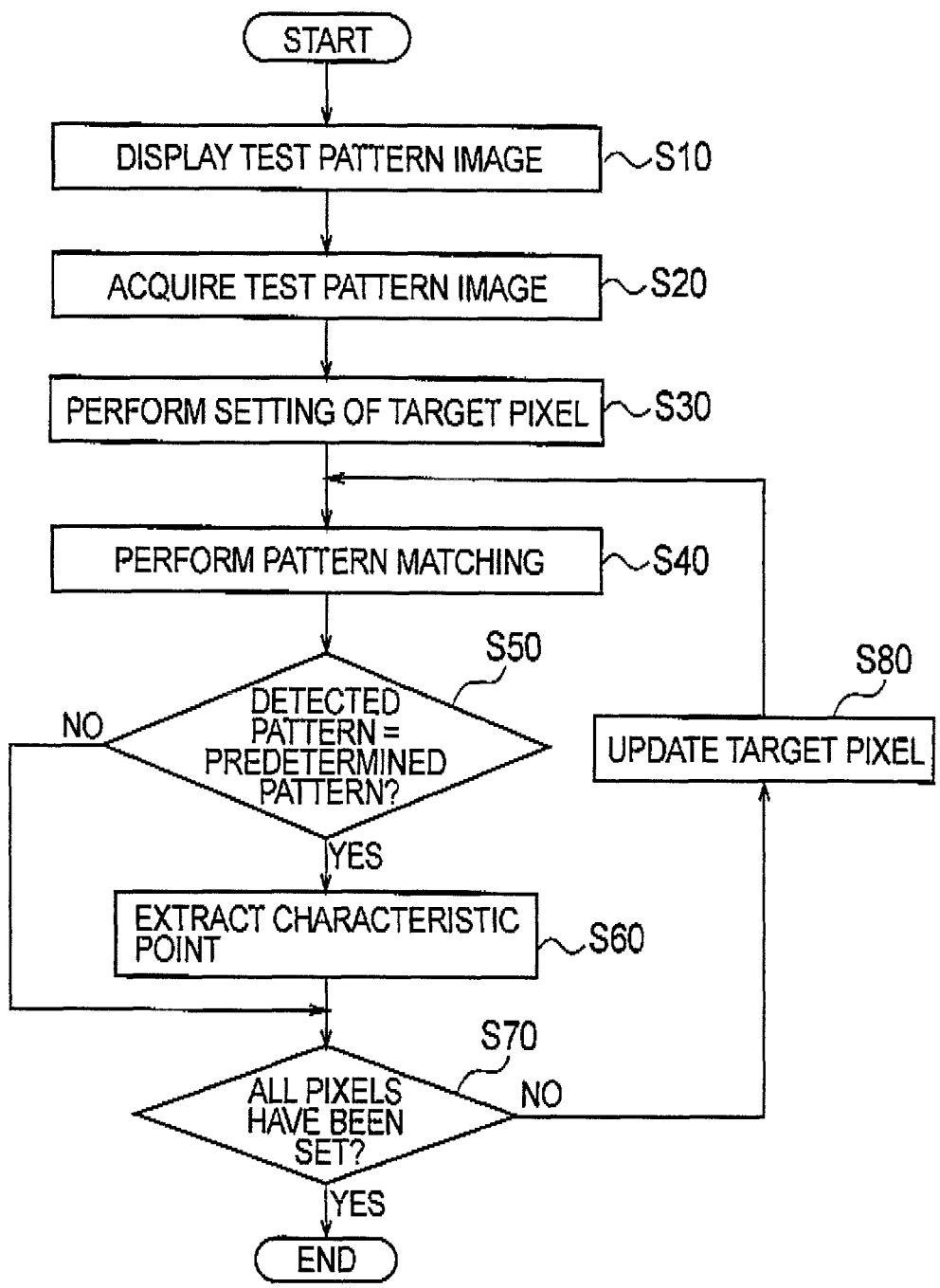

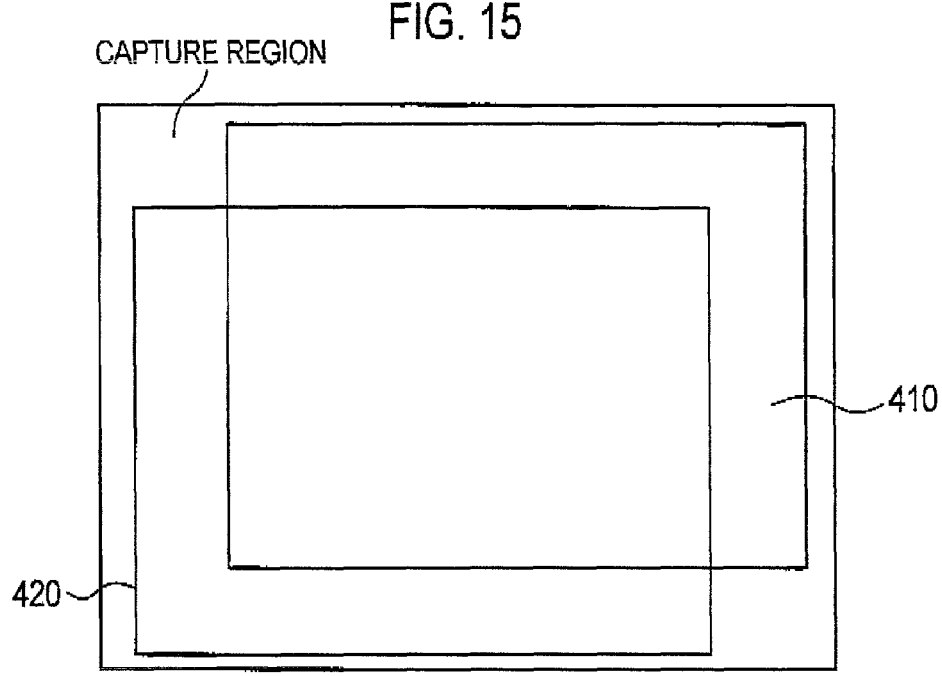
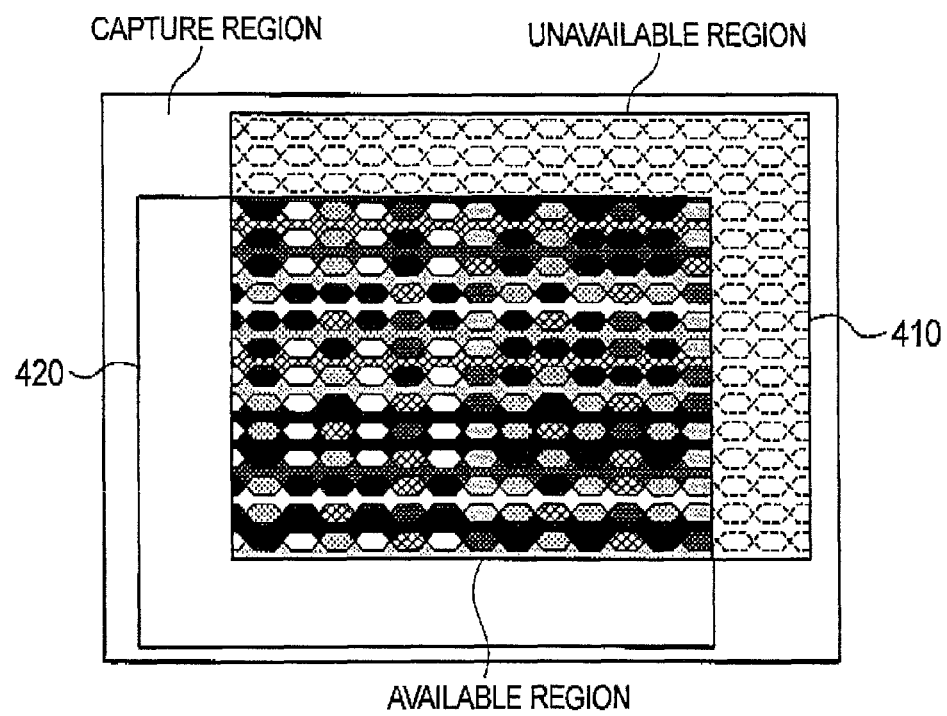

PROJECTION DISPLAY APPARATUS

CROSS REFERENCE TO RELATED APPLICATIONS

This application is based upon and claims the benefit of priority from prior Japanese Patent Application No. 2010-161744, filed on Jul. 16, 2010; the entire contents of which are incorporated herein by reference.

BACKGROUND OF INVENTION

1. Field of the Invention

The present invention relates to a projection display apparatus including an imager that modulates light emitted from a light source and a projection unit that projects light emitted from the imager on a projection surface.

2. Description of the Related Art

Conventionally, a projection display apparatus has been known which includes an imager modulating light emitted from a light source and a projection unit projecting light emitted from the imager on a projection surface.

Here, depending on a positional relationship between the projection display apparatus and the projection surface, the shape of the image projected on the projection surface is distorted.

To counter this, a proposal has been made of a method in which a test pattern image projected on a projection surface is captured by a imaging device such as a camera, a positional relationship between a projection display apparatus and the projection surface is determined by detecting characteristic points included in the test pattern image, and the shape of an image is adjusted based on the identified positional relationship (for example, Japanese Patent Application Publication No. 2001-83949).

For example, the following methods are proposed as methods of detecting the characteristic points. Specifically, they are (1) a method of detecting a relative positional relationship among multiple characteristic points (first method), (2) a method of detecting multiple characteristic points by lighting up the characteristic points one by one (second method), (3) a method of detecting multiple characteristic points by lighting up characteristic points at different frequencies (third method), and (4) a method of detecting multiple characteristic points by lighting the characteristic points different in hue (fourth method).

However, there are following problems in the methods described above. Specifically, in the first method, the relative positional relationship among the multiple characteristic points cannot be accurately detected when the entire test pattern image cannot be captured by the imaging device. In the second method, the number of test pattern images in each of which one characteristic point is lighted is large when the number of characteristic points is large, and thus a large memory capacity is required to store the test pattern images. In the third method, differences between the frames have to be detected to detect the characteristic points, and a circuit required for detection of the character points is complicated. In the fourth method, differences (color differences) among the hues of the characteristic points are small when the number of characteristic points is large, and false detection of the characteristic points is likely to occur.

SUMMARY OF THE INVENTION

A projection display apparatus of first aspect includes an imager (liquid crystal panel 50) that modulates light emitted from a light source (light source 10) and a projection unit (projection unit 110) that projects light emitted from the imager on a projection surface. The projection display apparatus includes: an imager controller (imager controller 260) that controls the imager to display a test pattern image in which a characteristic point is defined by at least three adjacent regions; an acquisition unit (identification unit 240) that acquires a captured image of the test pattern image from an imaging element configured to capture the test pattern image projected on the projection surface; and an adjustment unit (adjustment unit 280) that identifies the characteristic point included in the captured image on the basis of the captured image acquired by the acquisition unit and adjusts an image to be projected on the projection surface on the basis of the identified characteristic point. The at least three adjacent regions surround the characteristic point and are adjacent to the characteristic point.

In the first aspect, among, the at least three adjacent regions, a pair of regions adjacent to each other are different in luminance, saturation, or hue.

In the first aspect, the projection display apparatus further includes a storage unit (storage unit 220) that stores a plurality of adjustment parameters corresponding to a plurality of viewing positions, respectively, as adjustment parameters for adjusting the image projected on the projection surface. The imager controller controls the imager to display information indicating the viewing position associated with the adjustment parameter applied to the image projected on the projection surface.

A projection display apparatus of second aspect includes an imager that modulates light emitted from a light source and a projection unit that projects light emitted from the imager on a projection surface. The projection display apparatus includes: an imager controller that controls the imager to display a test pattern image in which a characteristic point is defined by at least three adjacent regions; an acquisition unit that acquires a captured image of the test pattern image from an imaging element configured to capture the test pattern image projected on the projection surface; and an adjustment unit that identifies the characteristic point included in the captured image on the basis of the captured image acquired by the acquisition unit and adjusts an image to be projected on the projection surface on the basis of the identified characteristic point. The at least three adjacent regions surround the characteristic point and are adjacent to the characteristic point, and the at least three adjacent regions each include color information selected from red, green, blue, cyan, yellow, magenta, white, and black.

BRIEF DESCRIPTION OF THE DRAWINGS

FIG. 14 is a flowchart showing operation of the projection display apparatus 100 of the first embodiment.

FIG. 15 is a view for describing determination of an unavailable region in Modification 1.

FIG. 16 is a view for describing the determination of the unavailable region in Modification 1.

DETAILED DESCRIPTION OF THE EMBODIMENTS

A projection display apparatus of an embodiment of the present invention will be described below with reference to the drawings. Note that, in the following description of the drawings, same or similar reference signs denote same or similar elements and portions.

In addition, it should be noted that the drawings are schematic and ratios of dimensions and the like are different from actual ones. Therefore, specific dimensions and the like should be identified in consideration of the following description. Moreover, the drawings also include portions having different dimensional relationships and ratios from each other.

[Overview of Embodiment]

A projection display apparatus of first aspect includes an imager that modulates light emitted from a light source and a projection unit that projects light emitted from the imager on a projection surface. The projection display apparatus includes: an imager controller that controls the imager to display a test pattern image in which a characteristic point is defined by at least three adjacent regions; an acquisition unit that acquires a captured image of the test pattern image from an imaging element configured to capture the test pattern image projected on the projection surface; and an adjustment unit that identifies the characteristic point included in the captured image on the basis of the captured image acquired by the acquisition unit and adjusts an image to be projected on the projection surface on the basis of the identified characteristic point. The at least three adjacent regions surround the characteristic point and are adjacent to the characteristic point.

In the embodiment, the characteristic point is defined by the at least three adjacent regions in the test pattern image. In other words, the characteristic point is defined by a combination of the at least three adjacent regions. Accordingly, the number of definable characteristic points is increased compared to a case of defining one characteristic point by one characteristic, provided that the number of types of characteristics used to define the characteristic points is the same. Thus, the characteristic points can be easily detected even in a case where the number of the characteristic point is large.

Note that, the at least three adjacent regions each include color information selected from, for example, red, green, blue, cyan, yellow, magenta, white, and black.

[First Embodiment]

(Outline of Projection Display Apparatus)

Figure 1:
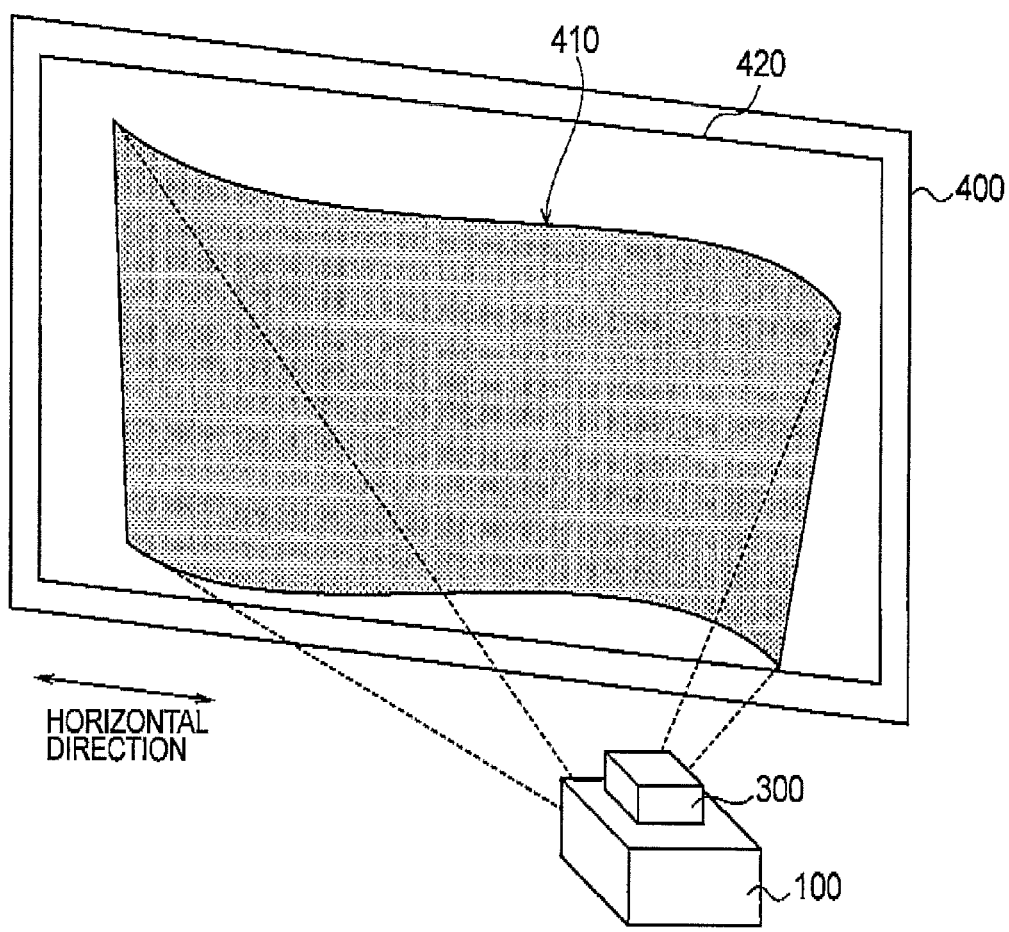
FIG. 1 is a view showing an outline of a projection display apparatus 100 of a first embodiment.

A projection display apparatus of a first embodiment will be described below with reference to the drawings. FIG. 1 is a view showing the outline of a projection display apparatus 100 of the first embodiment.

As shown in FIG. 1, the projection display apparatus 100 is provided with an imaging element 300. Moreover, the projection display apparatus 100 projects image light on a projection surface 400.

The imaging element 300 is configured to capture an image of the projection surface 400. Specifically, the imaging element 300 is configured to detect reflection light of the image light projected on the projection surface 400 by the projection display apparatus 100. The imaging element 300 may be built into the projection display apparatus 100 or may be installed side by side to the projection display apparatus 100.

The projection surface 400 is formed of a screen and the like. A range in which the projection display apparatus 100 can project the image light (projectable range 410) is formed on the projection surface 400. Moreover, the projection surface 400 includes a display frame 420 formed of an outer frame of the screen and the like.

In the first embodiment, descriptions are given of a case where the projection surface 400 is a curved surface. For example, the projection surface 400 is a surface provided on a column or a sphere. Otherwise, the projection surface 400 is a surface having a barrel distortion or a pincushion distortion. Note that, the first embodiment is also applicable to a flat projection surface.

(Configuration of Projection Display Apparatus)

Figure 2:
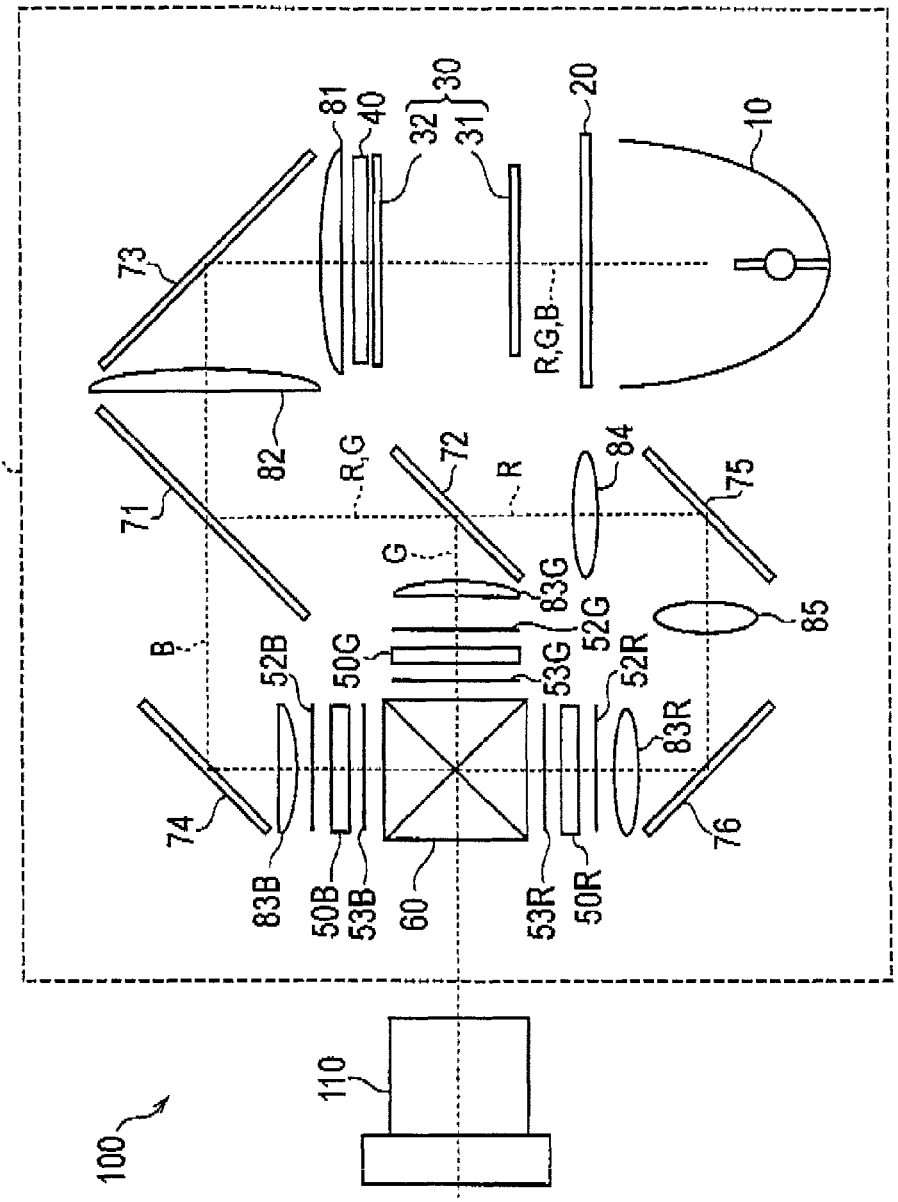
FIG. 2 is a view showing a configuration of the projection display apparatus 100 of the first embodiment.

The projection display apparatus of the first embodiment will be described below with reference to the drawing. FIG. 2 is a view showing a configuration of the projection display apparatus 100 of the first embodiment.

As show in FIG. 2, the projection display apparatus 100 includes a projection unit 110 and an illumination device 120.

The projection unit 110 projects the image light emitted from the illumination device 120 on the projection surface (not illustrated) or the like.

Firstly, the illumination device 120 includes a light source 10, an UV/IR cut filter 20, a fly-eye lens unit 30, a PBS array 40, multiple liquid crystal panels 50 (a liquid crystal panel 50R, a liquid crystal panel 50G, and a liquid crystal panel 50B), and a cross dichroic prism 60.

The light source 10 is a light source (for example, a UHP lamp or a xenon lamp) which emits a white light or the like. Specifically, the white light emitted by the light source 10 includes a red component light R, a green component light G, and a blue component light B.

The UV/IR cut filter 20 transmits a visible light component (red component light R, green component light G, and blue component light B) but blocks an infrared light component and an ultraviolet light component.

The fly-eye lens unit 30 causes the light emitted from the light source 10 to be uniform. Specifically, the fly-eye lens unit 30 is formed of a fly-eye lens 31 and a fly-eye lens 32. The fly-eye lens 31 and the fly-eye lens 32 are each formed of multiple microlenses. Each of the microlenses condenses the light emitted from the light source 10 in such a manner that the entire surfaces of the liquid crystal panels 50 are irradiated with the light emitted from the light source 10.

The PBS array 40 causes the polarization state of the light emitted from the fly-eye lens unit 30 to be uniform. For example, the PBS array 40 uniformly causes the light emitted from the fly-eye lens unit 30 to be S-polarized (or P-polarized).

The liquid crystal panel 50R modulates the red component light R on the basis of a red output signal $R_{out}$. On a light-entering side of the liquid crystal panel 50R, an entering-side polarizing plate 52R is provided which transmits light having a certain polarization direction (for example, S polarization) but blocks light having a different polarization direction (for example, P polarization). Meanwhile, on a light-emitting side of the liquid crystal panel 50R, an emitting-side polarizing plate 53R is provided which blocks, light having the certain polarization direction (for example, S polarization) and transmits light having the different polarization direction (for example, P polarization).

The liquid crystal panel 50G modulates the green component light G on the basis of a green output signal $G_{out}$. On a light-entering side of the liquid crystal panel 50G, an entering-side polarizing plate 52G is provided which transmits light having the certain polarization direction (for example, S polarization) but blocks light having the different polarization direction (for example, P polarization). Meanwhile, on a light-emitting side of the liquid crystal panel 50G, an emitting-side polarizing plate 53G is provided which blocks light having the certain polarization direction (for example, S polarization) and transmits light having the different polarization direction (for example, P polarization).

The liquid crystal panel 50B modulates the blue component light B on the basis of a blue output signal $B_{out}$. On a light-entering side of the liquid crystal panel 50B, an entering-side polarizing plate 52B is provided which transmits light having the certain polarization direction (for example, S polarization) but blocks light having the different polarization direction (for example, P polarization). Meanwhile, on a light-emitting side of the liquid crystal panel 50B, an emitting-side polarizing plate 53B is provided which blocks light having the certain polarization direction (for example, S polarization) and transmits light having the different polarization direction (for example, P polarization).

Note that, the red output signal $R_{out}$, the green output signal $G_{out}$, and the blue output signal $B_{out}$ constitute an image output signal. The image output signal is a signal for each of multiple pixels constituting one frame.

Here, each of the liquid crystal panels 50 may be provided with a compensating plate (not illustrated) which improves the contrast ratio and the transmission ratio. Moreover, each of the polarizing plates may include a pre-polarizing plate which reduces the light amount of light entering the polarizing plate and the thermal burden.

The cross dichroic prism 60 configures a color combination unit which combines lights emitted from the liquid crystal panel 50R, the liquid crystal panel 50G, and the liquid crystal panel 50B. The combined light emitted from the cross dichroic prism 60 is guided to the projection unit 110.

Secondly, the illumination device 120 includes a mirror group (a mirror 71 to a mirror 76) and a lens group (a lens 81 to a lens 85)

A mirror 71 is a dichroic mirror which transmits the blue component light B and reflects the red component light R and the green component light G. A mirror 72 is a dichroic mirror which transmits the red component light R and reflects the green component light G. The mirror 71 and the mirror 72 configure a color separation unit which separates the red component light R, the green component light G, and the blue component light B from each other.

A mirror 73 reflects the red component light R, the green component light G, and the blue component light B, and guides the red component light R, the green component light G, and the blue component light B to the mirror 71. A mirror 74 reflects the blue component light B and guides the blue component light B to the liquid crystal panel 50B. A mirror 75 and a mirror 76 reflect the red component light R and guides the red component R to the liquid crystal panel 50R.

A lens 81 is a condenser lens which condenses the light emitted from the PBS array 40. A lens 82 is a condenser lens which condenses the light reflected by the mirror 73.

A lens 83R causes the red component light R to be approximately parallel rays so that the liquid crystal panel 50R is irradiated with the red component light R. A lens 83G causes the green component light G to be approximately parallel rays so that the liquid crystal panel 50G is irradiated with the green component light G. A lens 83B causes the blue component light B to be approximately parallel rays so that the liquid crystal panel 50B is irradiated with the blue component light B.

A lens 84 and a lens 85 are each a relay lens which roughly images the red component light R on the liquid crystal panel 50R while suppressing an expansion of the red component light R.

(Configuration of Control Unit)

Figure 3:
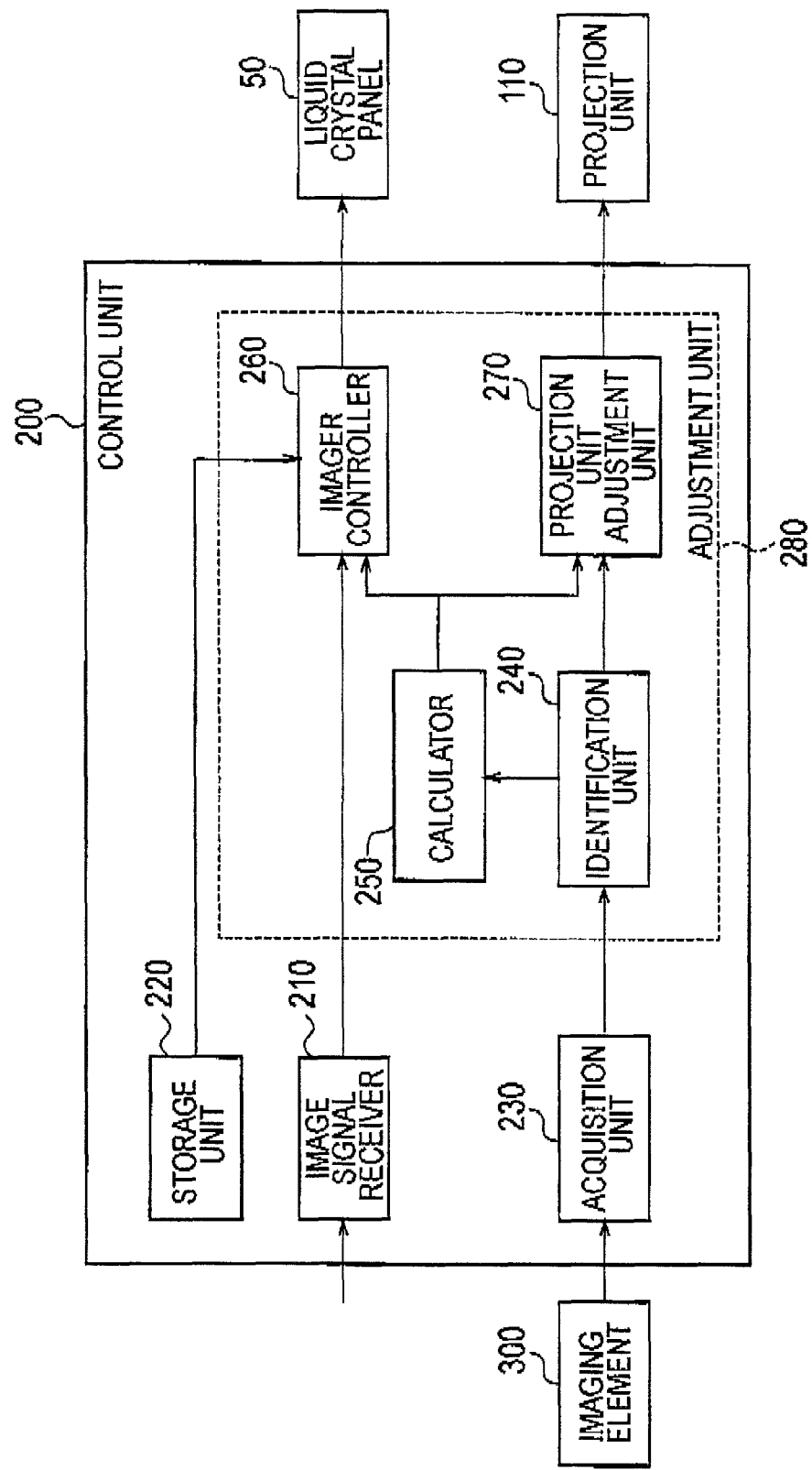
FIG. 3 is a block diagram showing a control unit 200 of the first embodiment.

A control unit of the first embodiment will be described below with reference to the drawings. FIG. 3 is a block diagram showing a control unit 200 of the first embodiment. The control unit 200 is provided in the projection display apparatus 100, and controls the projection display apparatus 100.

Note that, the control unit 200 converts an image input signal into the image output signal. The image input signal includes a red input signal $R_{in}$, a green input signal $G_{in}$, and a blue input signal $B_{in}$. The image output signal includes the red output signal $R_{out}$, the green output signal $G_{out}$, and the blue output signal $B_{out}$. The image input signal and the image output signal are signals inputted for each of multiple pixels constituting one frame.

As shown in FIG. 3, the control unit 200 includes an image signal receiver 210, a storage unit 220, an acquisition unit 230, an identification unit 240, a calculator 250, an imager controller 260, and a projection unit adjustment unit 270.

The image signal receiver 210 receives the image input signal from an external device (not shown) such as a DVD player or a TV tuner.

The storage unit 220 stores various pieces of information. Specifically, the storage unit 220 stores a test pattern image to be used for adjustment of an image projected on the projection surface 400.

Figure 4:
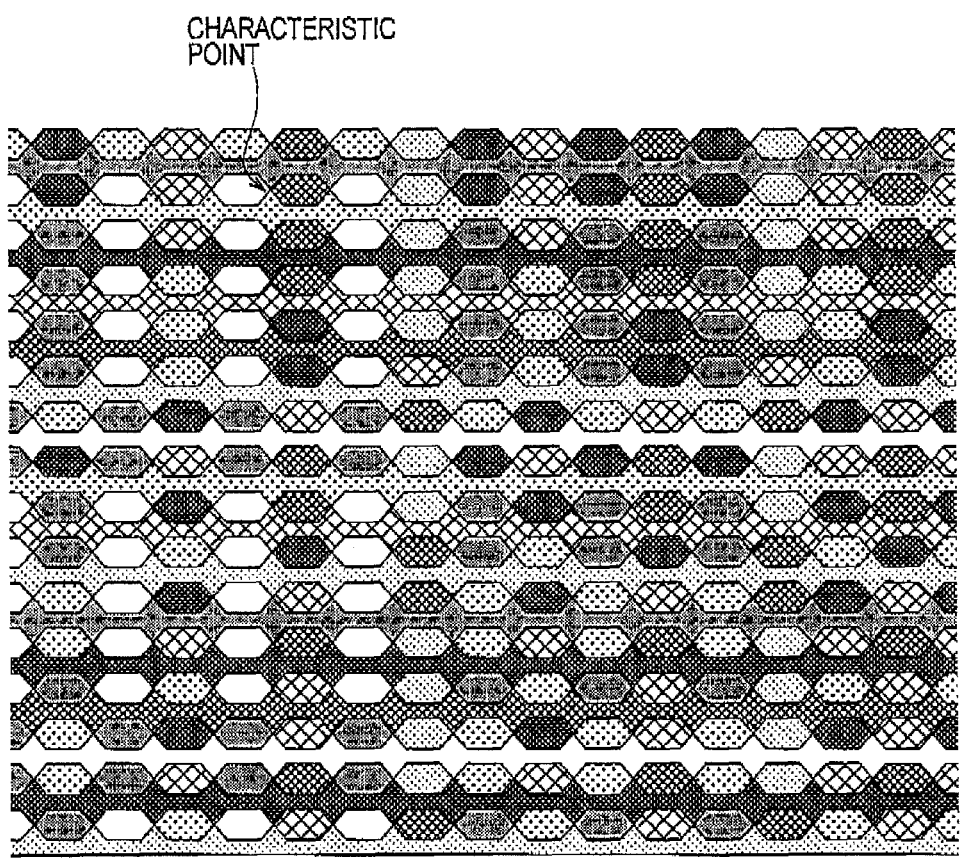
FIG. 4 is a view showing an example of a test pattern image of the first embodiment.
Figure 5:
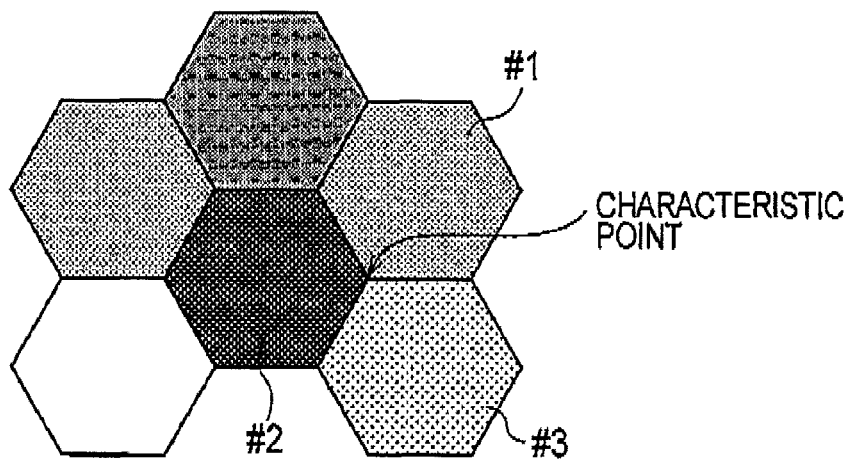
FIG. 5 is a view showing an example of the test pattern image of the first embodiment.

As shown in FIG. 4, for example, the test pattern images is an image in which each of characteristic points is defined by at least three adjacent regions. Specifically, as shown in FIG. 5, the test pattern image is an image in which the characteristic point is defined by three hexagonal regions. Otherwise, as shown in FIG. 6, the test pattern image is an image in which the characteristic point is defined by four rhombic regions.

Figure 6:
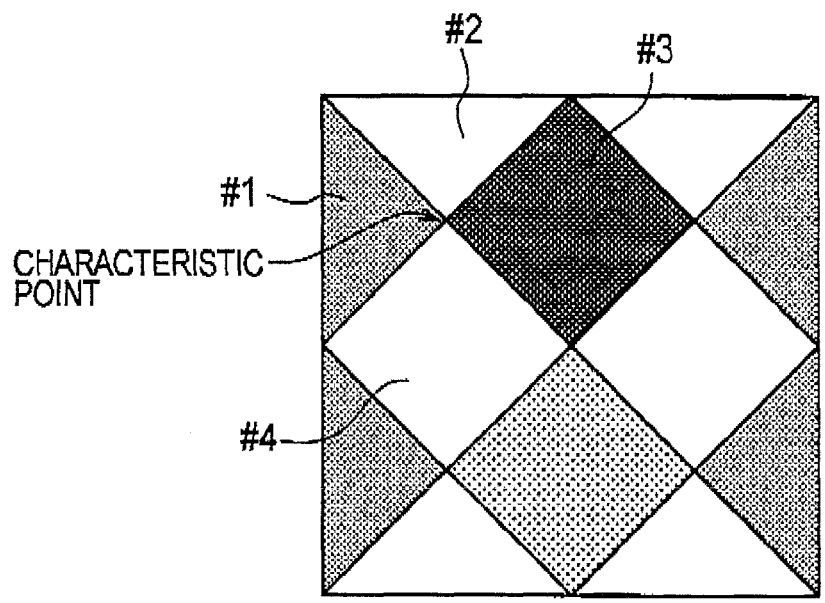
FIG. 6 is a view showing an example of the test pattern image of the first embodiment.

As shown in FIG. 5 or 6, the at least three adjacent regions surround the characteristic point, and are adjacent to the characteristic point. Moreover, among the at least three adjacent regions, a pair of regions adjacent to each other are different in luminance, saturation, or hue. For example, the at least three adjacent regions each have color information selected from red, green, blue, cyan, yellow, magenta, white, and black.

As described above, the characteristic point is defined by a combination of positions of the adjacent regions defining the characteristic point and characteristics (luminance, saturation, or hue) of the adjacent regions defining the characteristic point. For example, the number of characteristic points definable without duplication can be expressed as "$_nP_m$", where "m" is the number of the adjacent regions used to define each characteristic point, and "n" is the number of types of characteristics (luminance, saturation, or hue) of the adjacent regions used to define the characteristic points.

The acquisition unit 230 acquires the captured image from the imaging element 300. For example, the acquisition unit 230 acquires the captured image of the test pattern image which is outputted from the imaging element 300.

The identification unit 240 identifies the characteristic points included in the captured image on the basis of the captured image acquired by acquisition unit 230. Specifically, the identification unit 240 has a filter to extract the characteristics (luminance, saturation, or hue) of surrounding pixels provided around a target pixel. The filter is a filter used to extract pixels for identifying the adjacent regions defining the characteristic point, from the surrounding pixels.

Figure 7:
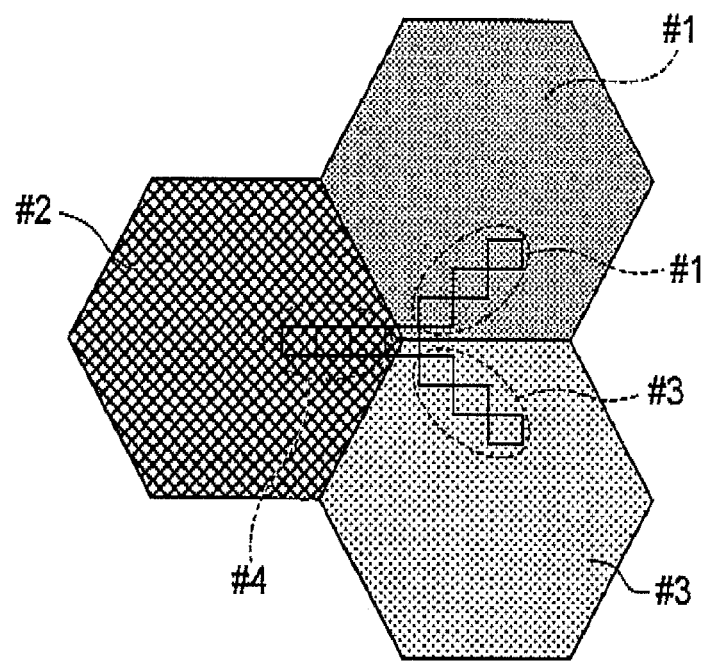
FIG. 7 is a view showing an example of a filter of the first embodiment.
Figure 8:
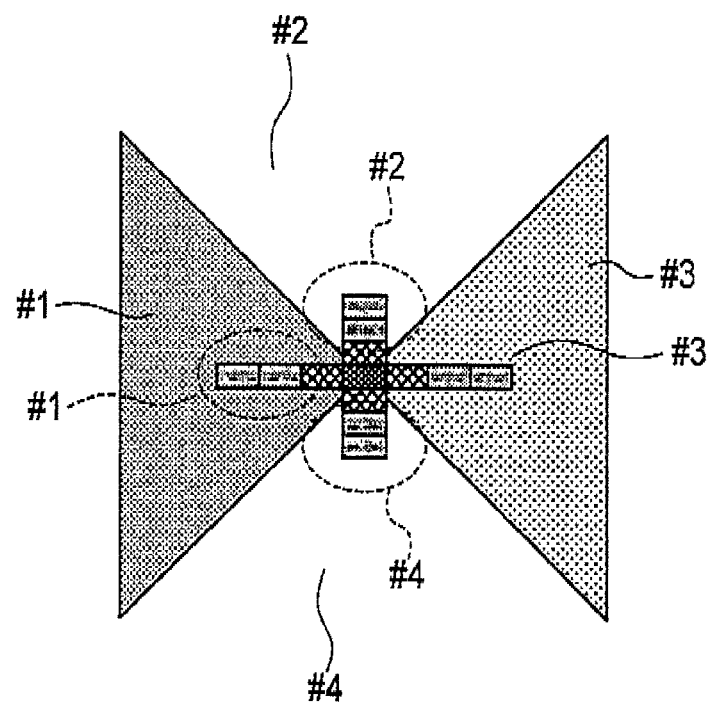
FIG. 8 is a view showing an example of the filter of the first embodiment.

For example, in a case where the test pattern image is the image shown in FIG. 5, the identification unit 240 has a filter as shown in FIG. 7 which extracts a predetermined number of pixels on the right-upper side of the target pixel, a predetermined number of pixels on the right-lower side of the target pixel, and a predetermined number of pixels on the left side of the target pixel. Otherwise, in a case where the test pattern image is the image shown in FIG. 6, the identification unit 240 has a filter as shown in FIG. 8 which extracts predetermined number of pixels on each of the right, left, upper, and lower sides of the target pixel.

The identification unit 240 sets a pixel included in the captured image acquired by the acquisition unit 230 as the target pixel, and judges whether or not the target pixel is the characteristic point by applying the filter to the target pixel. In other words, the identification unit 240 judges whether or not a pattern (detection patter) obtained by applying the filter is a predetermined pattern defining the characteristic point.

Returning to FIG. 3, the calculator 250 calculates an adjustment parameter for adjusting the image projected on the projection surface 400 on the basis of an arrangement of the characteristic points identified by the identification unit 240.

Figure 9:
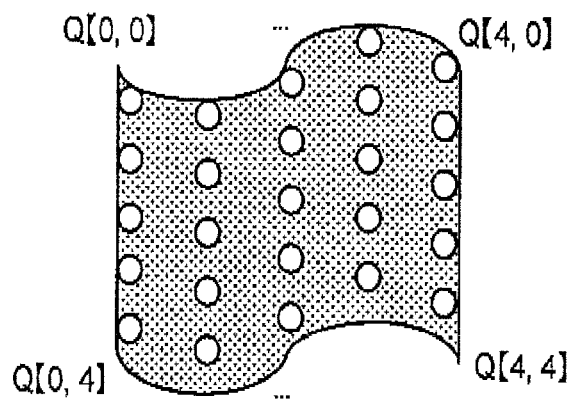
FIG. 9 is a view for describing identification of an adjustment parameter in the first embodiment.

As shown in FIG. 9, the calculator 250 first acquires the arrangement (characteristic point map) of the characteristic points identified by the identification unit 240.

Figure 10:
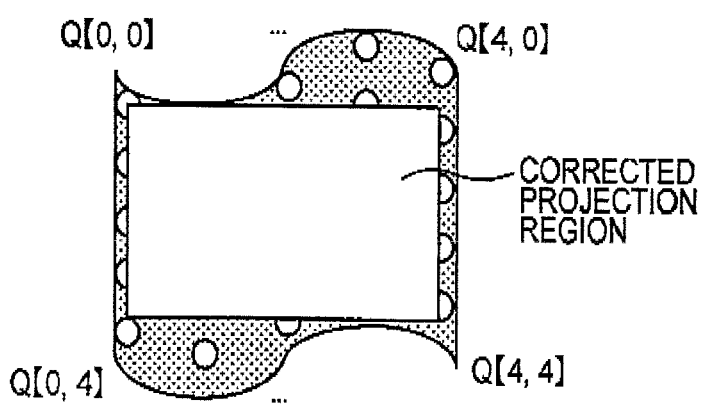
FIG. 10 is a view for describing the identification of the adjustment parameter in the first embodiment.

As shown in FIG. 10, secondly, the calculator 250 extracts a region in which the image can be projected without distortion (corrected projection region) from the characteristic point map shown in FIG. 9. Note that, since the characteristic map shown in FIG. 9 is generated based on the captured image captured by the imaging element 300, the corrected projection region is a region in which the image can be projected without distortion in a view from the position of the imaging element 300.

Figure 11:
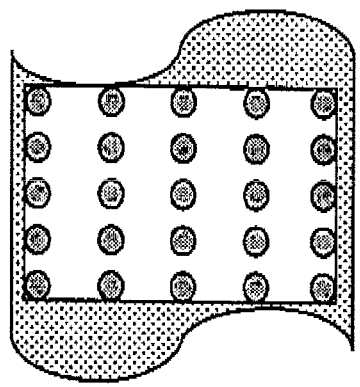
FIG. 11 is a view for describing the identification of the adjustment parameter in the first embodiment.

As shown in FIG. 11, thirdly, the calculator 250 calculates the adjustment parameter used to correctly arrange the characteristic points in the corrected projection region. In other words, the adjustment parameter is a parameter for adjusting the positions of the characteristic points included in the characteristic point map so that the coordinates (relative position) of each characteristic point included in the test pattern image stored in the storage unit 220 is satisfied.

Fourthly, the calculator 250 calculates the adjustment parameter of a pixel included in a region surrounded by four characteristic points. Specifically, the calculator 250 calculates the adjustment parameter, virtually assuming that the region surrounded by four characteristic points is a flat surface.

Figure 12:
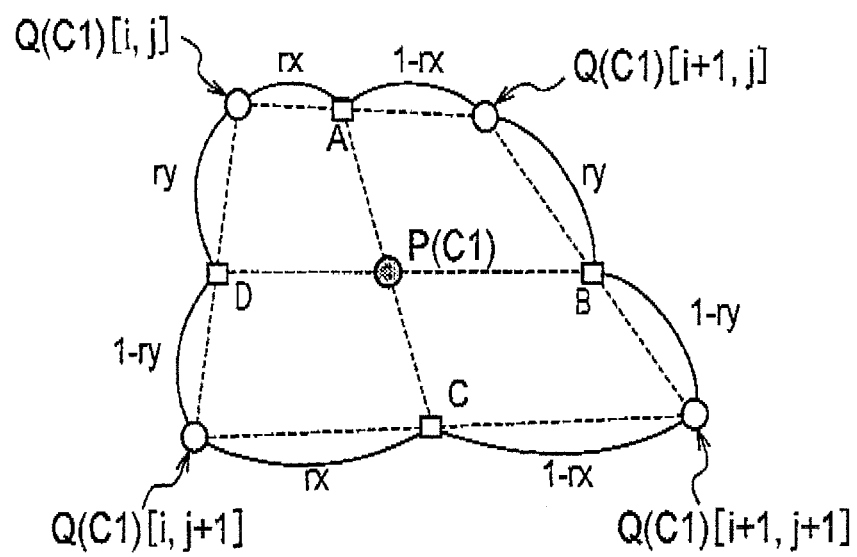
FIG. 12 is a view for describing the identification of the adjustment parameter in the first embodiment.
Figure 13:
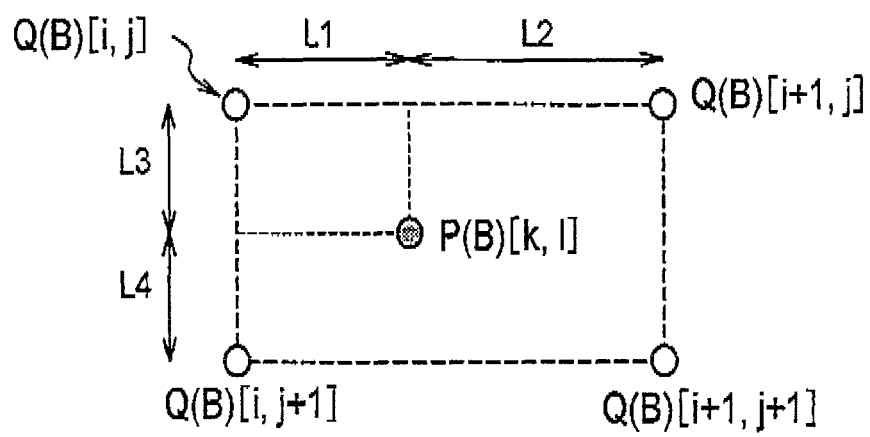
FIG. 13 is a view for describing the identification of the adjustment parameter in the first embodiment.

For example, as shown in FIG. 12, a description is given of a calculation of the adjustment parameter of pixel P(C1) included in a region surrounded by four characteristic points which are included in the captured image captured by the imaging element 300 and are expressed as Q(C1) [i,j], Q(C1) [i+1,j], Q(C1) [i,j+1], and Q(C1) [i+1,j+1], respectively. As shown in FIG. 13, the pixels corresponding to Q(C1) [i,j], Q(C1) [i+1,j], Q(C1) [i,j+1], Q(C1) [i+1,j+1], and P(C1) are expressed as Q(B) [i,j], Q(B) [i+1,j], Q(B) [i,j+1], Q(B) [i+1,j+1], and P(B) [k,l], respectively, in the test pattern image stored in the storage unit 220. Note that, the coordinates of each of Q(B) [i,j], Q(B) [i+1,j], Q(B) [i,j+1], Q(B) [i+1,j+1], and P(B) [k,l] are already known. In such case, the coordinates of P(C1) can be calculated based on the coordinates of each of Q(C1) [i,j], Q(C1) [i+1,j], Q(C1) [i,j+1], and Q(C1) [i+1,j+1], and interior division ratios (rx, ry). The interior division ratios are expressed by the following formulae.

$$rx = L1/(L1+L2)$$

$$ry = L3/(L3+L4)$$

Returning to FIG. 3, the imager controller 260 converts the image input signal to the image output signal, and controls the liquid crystal panels 50 on the basis of the image output signal. Specifically, the imager controller 260 automatically corrects the shape of the image projected on the projection surface 400 on the basis of the adjustment parameter (shape adjustment). In other words, the imager controller 260 has a function to automatically perform trapezoidal correction on the basis of the positional relationship between the projection display apparatus and the projection surface 400.

The projection unit adjustment unit 270 controls the lens group provided in the projection unit 110. First the projection unit adjustment unit 270 shifts the lens group provided in the projection unit 110 so that the projectable range 410 is within the display frame 420 provided on the projection surface 400 (zoom adjustment). The projection unit adjustment unit 270 adjusts the focus of the image projected on the projection surface 400 by shifting the lens group provided in the projection unit 110 (focus adjustment).

Note that, the identification unit 240, the calculator 250, the imager controller 260, and the projection unit adjustment unit 270 constitute an adjustment unit 280 adjusting the image projected on the projection surface 400.

(Operation of Projection Display Apparatus)

The operation of the projection display apparatus (control unit) of the first embodiment will be described below with reference to the drawings. FIG. 14 is a flowchart showing the operation of the projection display apparatus 100 (control unit 200) of the first embodiment.

As shown in FIG. 14, in step 10, the projection display apparatus 100 displays (projects) the test pattern image on the projection surface 400.

In step 20, the projection display apparatus 100 acquires the captured image of the test pattern image from the imaging element 300.

In step 30, the projection display apparatus 100 sets any one pixel of the multiple pixels constituting the captured image of the test pattern image as the target pixel.

In step 40, the projection display apparatus 100 performs pattern matching. Specifically, the projection display apparatus 100 applies the filter to the target pixel, and acquires the pattern (detected pattern) of the pixels around the target pixel.

In step 50, the projection display apparatus 100 judges whether or not the pattern (detected pattern) obtained by the application of the filter is the predetermined pattern defining the characteristic point. If the detected pattern matches the predetermined pattern, the projection display apparatus 100 proceeds to a process of step 60. If the detected pattern does not match the predetermined pattern, the projection display apparatus 100 proceeds to a process of step 70.

In step 60, the projection display apparatus 100 extracts the target pixel as the characteristic point.

In step 70 the projection display apparatus 100 judges whether or not all of the pixels constituting the captured image of the test pattern image have been set as the target pixel. If all of the pixels have been set as the target pixel, the projection display apparatus 100 terminates the series of processes. If not all of the pixels have been set as the target pixel, the projection display apparatus 100 proceeds to a process of step 80.

In step 80, the projection display apparatus 100 updates the target pixel. Specifically, the projection display apparatus 100 sets a pixel as the target pixel, the pixel being one among the multiple pixels constituting the captured image of the test pattern image and not having been set as the target pixel.

(Operation and Effect)

In the first embodiment, each of the characteristic points is defined by the at least three adjacent regions in the test pattern image. In other words, the combination of the at least three adjacent regions defines the characteristic point. Accordingly, the number of definable characteristic points can be increased compared to a case of defining one characteristic point by one characteristic, provided that the number of types of characteristics (for example, hue and luminance) used to define the characteristic points is the same. Accordingly, the characteristic points can be easily detected even in a case where the number of the characteristic points is large.

[Modification 1]

Modification 1 of the first embodiment will be described below with reference to the drawings. The differences from the first embodiment will be mainly described below.

Specifically, as shown in FIG. 15, descriptions are given in Modification 1 of a case where a capture region of the imaging element 300, the projectable range 410, and the display frame 420 do not completely overlap each other. In such case, in the projectable range 410, a portion of the test pattern image displayed outside the display frame 420 may not be detected with desired hue and luminance by the imaging element 300.

Accordingly, as shown in FIG. 16, the projection display apparatus 100 judges that a region outside the display frame 420 in the projectable range 410 is an unavailable region in Modification 1. In other words, the projection display apparatus 100 judges that a region inside the display frame 420 in the projectable range 410 is an available region. The projection display apparatus 100 does not use the test pattern image displayed in the unavailable region for the identification of the characteristic points.

Note that, the projection display apparatus 100 is capable of, for example, projecting a white image on the projection surface 400 and detecting the display frame 420 on the basis of a captured image of the white image. The detection of the display frame 420 is performed before the identification of the characteristic points, as a matter of course.

(Operation and Effect)

In many cases, the color of the region outside the display frame 420 is different from the color of the region inside the display frame 420 (screen). In Modification 1, the region outside the display frame 420 in the projectable range 410 is judged as the unavailable region. Thus, false detection of the characteristic point is suppressed.

[Modification 2]

Modification 2 of the first embodiment will be described below with reference to the drawings. The differences from the first embodiment will be mainly described below.

Specifically, in Modification 2, the projection display apparatus 100 (storage unit 220) stores multiple adjustment parameters respectively corresponding to multiple viewing positions, as the adjustment parameters for adjusting the image projected on the projection surface 400.

Figure 17:
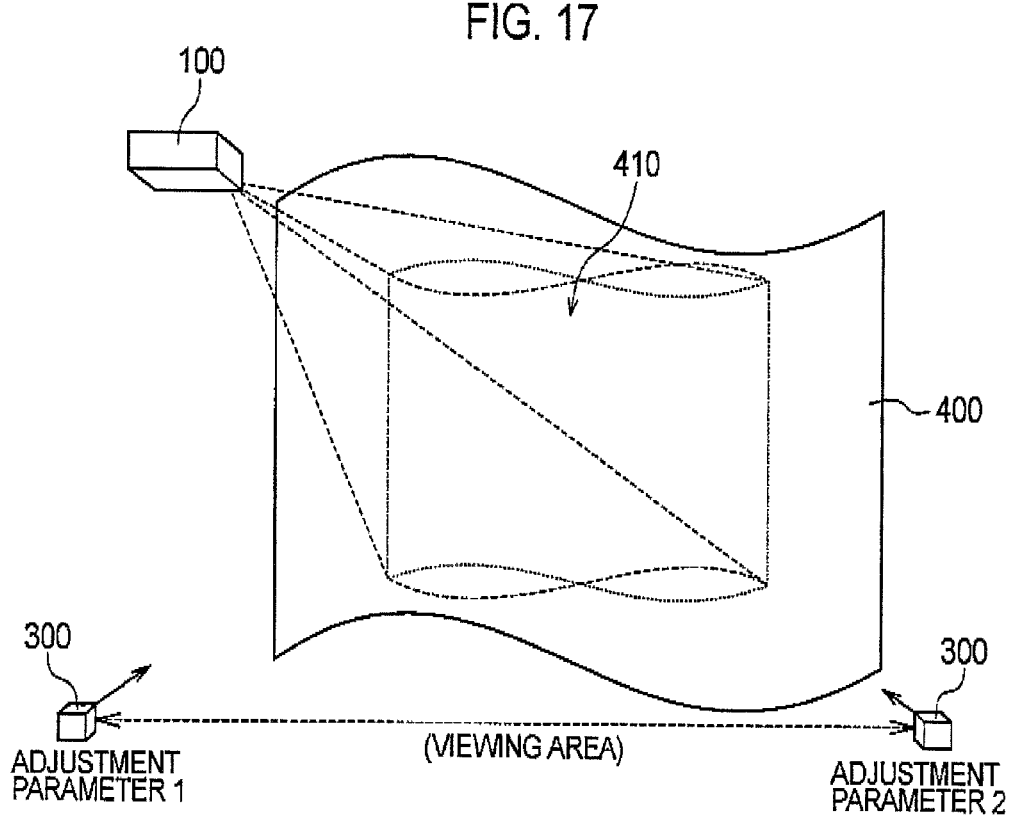
FIG. 17 is a view for describing change of the adjustment parameter in Modification 2.

For example, as shown in FIG. 17, the projection display apparatus 100 (storage unit 220) captures the test pattern image with the imaging element 300, from positions respectively at the edges of a viewing area, and calculates the adjustment parameter used in a case where a viewing position is each of the edges of the viewing area. Thus, the projection display apparatus 100 (storage unit 220) stores in advance the adjustment parameters used in the cases where the viewing positions are the edges of the viewing area.

Moreover, the projection display apparatus 100 (imager controller 260) controls the liquid crystal panels 50 to display information indicating the viewing position associated with the adjustment parameter applied to the image projected on the projection surface 400.

Figure 18:
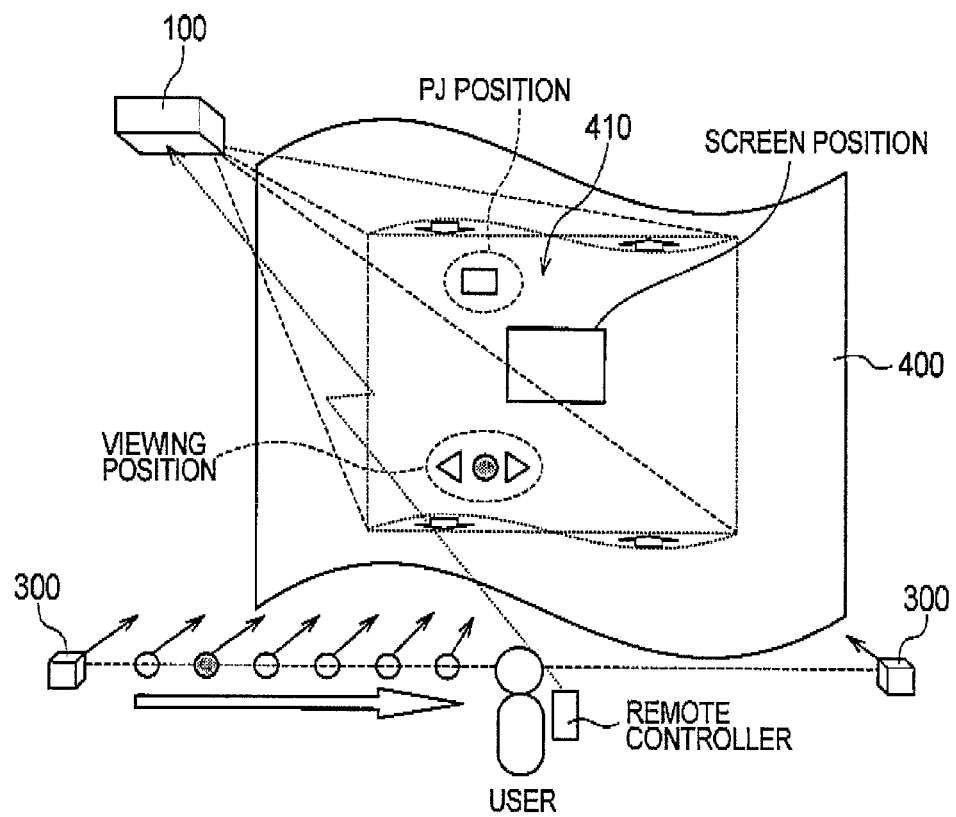
FIG. 18 is a view for describing the change of the adjustment parameter in Modification 2.

For example, as shown in FIG. 18, the information indicating the viewing position is a relative positional relationship between a "viewing position" and a "screen position", a relative positional relationship between the "viewing position" and a "PJ position", and the like. The "viewing position" indicates a position associated with the adjustment parameter applied to the image projected on the projection surface 400. The "screen position" indicates a position of the display frame 420 (screen). The "PJ position" indicates the position of the projection display apparatus 100.

Thus, the user can give an instruction to change the adjustment parameter by using a remote controller or the like, while comparing the "information indicating the viewing position" projected on the projection surface 400 with a relative positional relationship between the user and the screen (or a relative positional relationship between the user and the projection display apparatus 100).

[Modification 3]

Modification 3 of the first embodiment will be described below with reference to the drawings. The differences from Modification 2 will be mainly described below.

Figure 19:
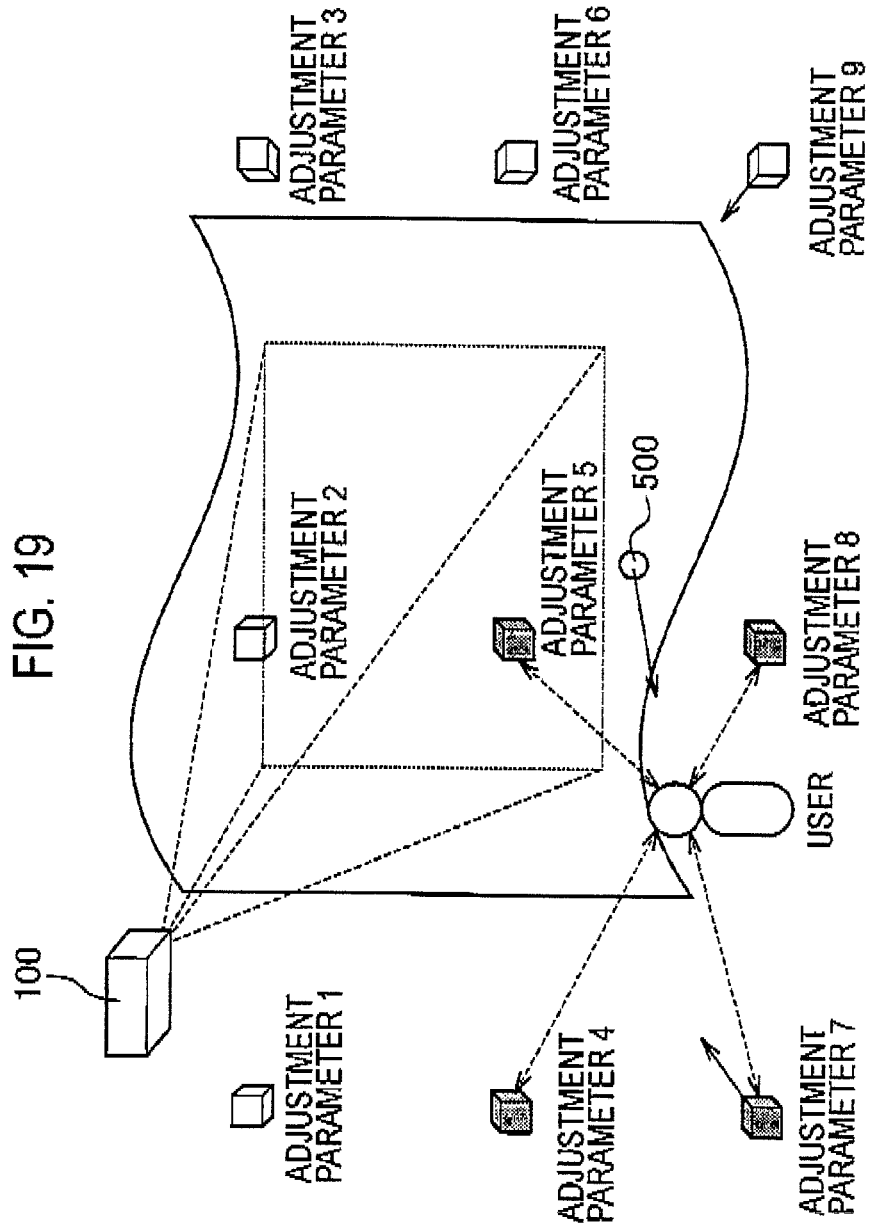
FIG. 19 is a view for describing the determination of the adjustment parameter in Modification 3.

Specifically, as shown in FIG. 19, a detection device 500 which detects the position of the user is provided in Modification 3. For example, the projection display apparatus 100 stores nine types of adjustment parameters (adjustment parameters 1 to adjustment parameter 9) respectively corresponding to nine viewing positions.

In such case, the projection display apparatus 100 determines the adjustment parameters (adjustment parameters 4, 5, 7, and 8) corresponding to the viewing position close to the position of the user, on the basis of the position of the user detected by the detection device 500. Then, the projection display apparatus 100 calculates the adjustment parameter corresponding to the position of the user on the basis of the determined adjustment parameter.

Thus, the appropriate adjustment parameter can be set without giving an instruction to change the adjustment parameter by using a remote controller or the like.

[Other Embodiment]

As described above, the details of the present invention have been described by using the embodiment of the present invention. However, it should not be understood that the description and drawings which constitute part of this disclosure limit the present invention. From this disclosure, various alternative embodiments, examples, and operation techniques will be easily found by those skilled in the art.

In the embodiment described above, the white light source is given as an example of the light source. However, the light source may be a LED (Light Emitting Diode) or a LD (Laser Diode).

In the embodiment described above, the transmissive liquid crystal panel is given as an example of the imager. However, the imager may be a reflective liquid crystal panel or a DMD (Digital Micromirror Device).

Figure 20:
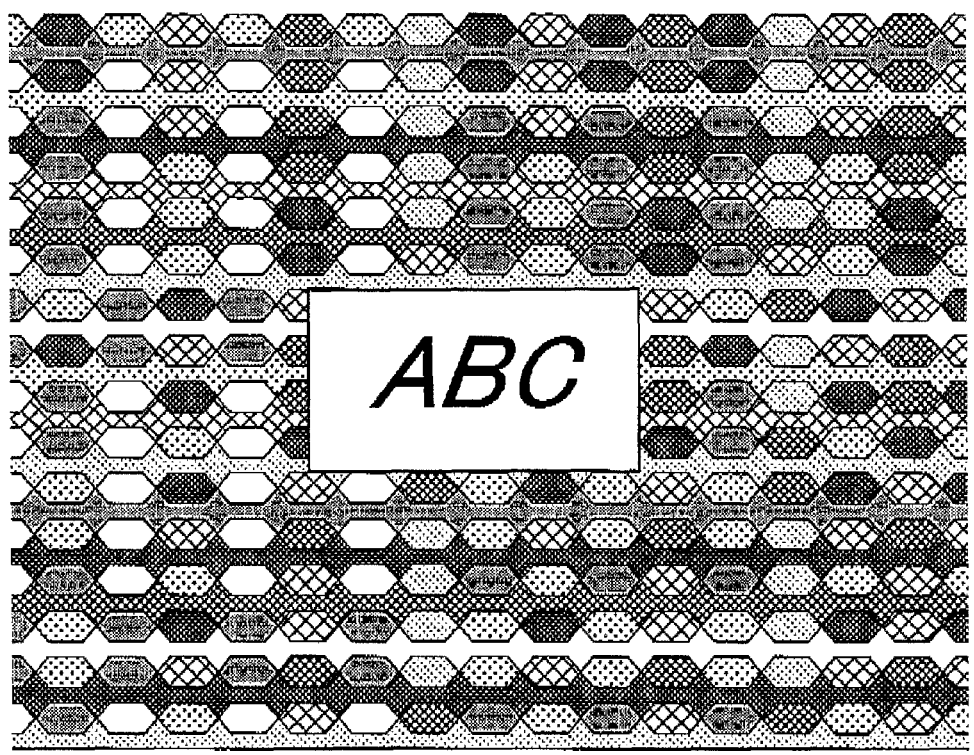
FIG. 20 is a view showing an example of a test pattern image according to another embodiment.

Although not particularly described in the embodiment, the projection display device 100 (imager controller 260) may control the liquid crystal panels 50 to display other information (logo and character strings) in addition to the test pattern image as shown in FIG. 20. Note that, the other information is prepared to include no information of the predetermined pattern defining the characteristic points, as a matter of course.

What is claimed is:

1. A projection display apparatus including an imager that modulates light emitted from a light source and a projection unit that projects light emitted from the imager on a projection surface, the projection display apparatus comprising:
    an imager controller that controls the imager to display a test pattern image in which a characteristic point is defined by at least three adjacent regions;
    an acquisition unit that acquires a captured image of the test pattern image from an imaging element configured to capture the test pattern image projected on the projection surface; and
    an adjustment unit that identifies the characteristic point included in the captured image on the basis of the captured image acquired by the acquisition unit, calculates adjustment parameters for an image to be projected on the projection surface based on the difference in position of the identified characteristic point from the test pattern characteristic point and adjusts the image based on the calculated adjustment parameters, wherein
    the at least three adjacent regions surround the characteristic point and are adjacent to the characteristic point.

2. The projection display apparatus according to claim 1, wherein, among the at least three adjacent regions, a pair of regions adjacent to each other and having the same side as a boundary of the pair of regions are different in luminance, saturation, or hue.

3. The projection display apparatus according to claim 1, further comprising a storage unit that stores a plurality of adjustment parameters corresponding to a plurality of viewing positions, respectively, as adjustment parameters for adjusting the image projected on the projection surface, wherein
    the imager controller controls the imager to display information indicating the viewing position associated with the adjustment parameter applied to the image projected on the projection surface.

4. A projection display apparatus including an imager that modulates light emitted from a light source and a projection unit that projects light emitted from the imager on a projection surface, the projection display apparatus comprising:
    an imager controller that controls the imager to display a test pattern image in which a characteristic point is defined by at least three adjacent regions;
    an acquisition unit that acquires a captured image of the test pattern image from an imaging element configured to capture the test pattern image projected on the projection surface; and
    an adjustment unit that identifies the characteristic point included in the captured image on the basis of the captured image acquired by the acquisition unit, calculates adjustment parameters for an image to be projected on the projection surface based on the difference in position of the identified characteristic point from the test pattern characteristic point and adjusts the image based on the calculated adjustment parameters, wherein
    the at least three adjacent regions surround the characteristic point and are adjacent to the characteristic point, and
    the at least three adjacent regions each include color information selected from red, green, blue, cyan, yellow, magenta, white, and black.

5. The projection display apparatus according to claim 4, wherein, among the at least three adjacent regions, a pair of regions adjacent to each other and having the same side as a boundary of the pair of regions are different in luminance, saturation, or hue.

6. A projection display method for modulating light emitted from a light source by an imager and projecting light emitted from the imager on a projection surface by a projection unit, the projection display method comprising:
    controlling the imager to display a test pattern image in which a characteristic point is defined by at least three adjacent regions, the at least three adjacent regions surrounding the characteristic point and being adjacent to the characteristic point;
    acquiring a captured image of the test pattern image from an imaging element configured to capture the test pattern image projected on the projection surface; and
    identifying the characteristic point included in the captured image on the basis of the acquired captured image, calculating adjustment parameters for an image to be projected on a projection surface based on the difference in position of the identified characteristic point from the test pattern characteristic point and adjusting the image based on the calculated adjustment parameters.

7. The projection display method according to claim 6, wherein, among the at least three adjacent regions, a pair of regions adjacent to each other and having the same side as a boundary of the pair of regions are different in luminance, saturation, or hue.

8. The projection display method according to claim 6, wherein the at least three adjacent regions each include color information selected from red, green, blue, cyan, yellow, magenta, white, and black, and
    among the at least three adjacent regions, a pair of regions adjacent to each other and having the same side as a boundary of the pair of regions have different color information.

9. A projection display system for modulating light emitted from a light source by an imager and projecting light emitted from the imager on a projection surface by a projection unit, the projection display system comprising:
    a control unit that controls the imager to display a test pattern image in which a characteristic point is defined by at least three adjacent regions, the at least three adjacent regions surrounding the characteristic point and being adjacent to the characteristic point;
    an acquisition unit that acquires a captured image of the test pattern image from an imaging element configured to capture the test pattern image projected on the projection surface; and
    an adjustment unit that identifies the characteristic point included in the captured image on the basis of the captured image acquired by the acquisition unit calculates adjustment parameters for an image to be projected on a projection surface based on the difference in position of the identified characteristic point from the test pattern characteristic point and adjusts the image based on the calculated adjustment parameters.

10. The projection display system according to claim 9, wherein, among the at least three adjacent regions, a pair of regions adjacent to each other and having the same side as a boundary of the pair of regions are different in luminance, saturation, or hue.

11. The projection display system according to claim 9, wherein the at least three adjacent regions each include color information selected from red, green, blue, cyan, yellow, magenta, white, and black; and among the at least three adjacent regions, a pair of regions adjacent to each other and having the same side as a boundary of the pair of regions have different color information.

* * * * *